United States Patent
Hsu

(10) Patent No.: US 6,550,155 B1
(45) Date of Patent: Apr. 22, 2003

(54) TAPE RULE WITH AUTOMATIC BLADE EXTENSION MECHANISM

(76) Inventor: Cheng-Hui Hsu, No. 126, Pad Chung Rd, Hsin Tien City, Taipei Hsien (TW)

(*) Notice: Subject to any disclaimer, the term of this patent is extended or adjusted under 35 U.S.C. 154(b) by 0 days.

(21) Appl. No.: 10/062,767

(22) Filed: Feb. 5, 2002

(51) Int. Cl.[7] .............................................. G01B 3/10
(52) U.S. Cl. ........................... 33/755; 33/761; 242/395
(58) Field of Search .......................... 33/755, 756, 760, 33/761, 413, 414; 242/389, 394, 395, 395.1

(56) References Cited

U.S. PATENT DOCUMENTS

| | | | | |
|---|---|---|---|---|
| 754,827 A | * | 3/1904 | Thompson | 33/414 |
| 1,237,808 A | * | 8/1917 | Ottinger | 33/760 |
| 2,914,269 A | * | 11/1959 | Freeman | 242/395.1 |
| 4,164,334 A | * | 8/1979 | Rathbun et al. | 33/761 |
| 4,660,291 A | * | 4/1987 | Dehn | 33/414 |
| 4,972,600 A | * | 11/1990 | Nosek | 33/761 |
| 6,357,133 B1 | * | 3/2002 | Hsu | 33/755 |
| 6,434,843 B1 | * | 8/2002 | Shor | 33/414 |
| 6,464,160 B2 | * | 10/2002 | Hsu | 242/395 |
| 6,477,785 B1 | * | 11/2002 | Hsu | 33/761 |

* cited by examiner

Primary Examiner—G. Bradley Bennett
(74) Attorney, Agent, or Firm—Rosenberg, Klein & Lee

(57) ABSTRACT

A tape rule with an automatic blade extension mechanism in which the internal ruler blade reel is not equipped with a center-wound, spiral retraction spring. The torsion developed by winding the steel ruler blade around the reel is of sufficient magnitude such that when the ruler blade is released, it automatically extends to facilitate taking measurements. As such, the present invention is of higher industrial and practical value.

1 Claim, 6 Drawing Sheets

TAPE RULE WITH AUTOMATIC BLADE EXTENSION MECHANISM

BACKGROUND OF THE INVENTION

1) Field of the Invention

The invention herein relates to measuring hardware, specifically a tape rule with an automatic blade extension mechanism in which the torsion developed by winding the steel ruler blade around the reel is of sufficient magnitude such that when the ruler blade is released, it automatically extends. At the same time, the present invention is equipped with a gear train that enables the smooth retraction of the ruler blade to thereby further enhance the practical value of tape rule herein.

2) Description of the Prior Art

A conventional tape rule is comprised of a tape reel that consists of a center-wound, spiral spring at the interior section, a ruler blade wound on the exterior section, and a hook riveted to the front end of the ruler blade; the center section of the spiral spring on the said tape reel is inserted over the center shaft of the left case half; and the front end of the ruler blade is positioned in a bumper block which is secured inside the bottom section and front end of the left case half, with the other side of the said bumper block secured inside the bottom section and front end of the right case half; and a plurality of screws are inserted through the right case half and fastened into the center shaft and mounting posts of the left case half to thereby complete the assembly of the tape rule body. The conventional product is utilized by pulling out the ruler blade of the tape rule to an appropriate length during a measurement operation and then releasing the hook of the tape rule when measuring is finished. Since the tension of the spiral spring (similar to the type utilized in most tape rule spring mechanisms) inside increases in proportion to the length unwound and, therefore, the rewinding speed is faster when the length is greater; if the said ruler blade is constructed of metal, the user is susceptible to cutaneous injuries of the hand, which is an inconvenient shortcoming of the conventional product. Furthermore, if the rewinding speed is too rapid, the force of impact against the bumper block is intensified, the poor cushioning performance by the conventional bumper block often leads to the dislodging of the hook, a serious shortcoming that preludes further utilization. In the structure of the said conventional tape rule a spiral spring is installed in the tape rule to enable the forceful retraction of the ruler blade when the ruler blade hook is released after measurement is completed. Conversely, when the user wants to perform a measurement, the ruler blade must be pulled from the tape rule to an appropriate length, but such an operation is extremely inconvenient if done as a one-man operation. To innovate a more practical and convenient tape rule, the inventor of the invention herein conducted exhaustive research and development based on many years of professional manufacturing experience and, furthermore, subjected the results to extensive testing and further refinement to achieve an even higher level of practical value, which finally culminated in the tape rule with an automatic blade extension mechanism.

SUMMARY OF THE INVENTION

Therefore, the primary objective of the invention herein is to provide a tape rule with an automatic blade extension mechanism, wherein the torsion developed by winding the steel ruler blade around the reel is of sufficient magnitude such that when the ruler blade is released, it automatically extends and, furthermore, a rewinding gear train is built-in, thereby further improving the tape rule structure and increasing its practical value.

To enable the examination committee a further understanding of the structural features and content as well as the advantages and features of the present invention, the brief description of the drawings below are followed by the detailed description of the invention.

DETAILED DESCRIPTION OF THE INVENTION

Figure 1:
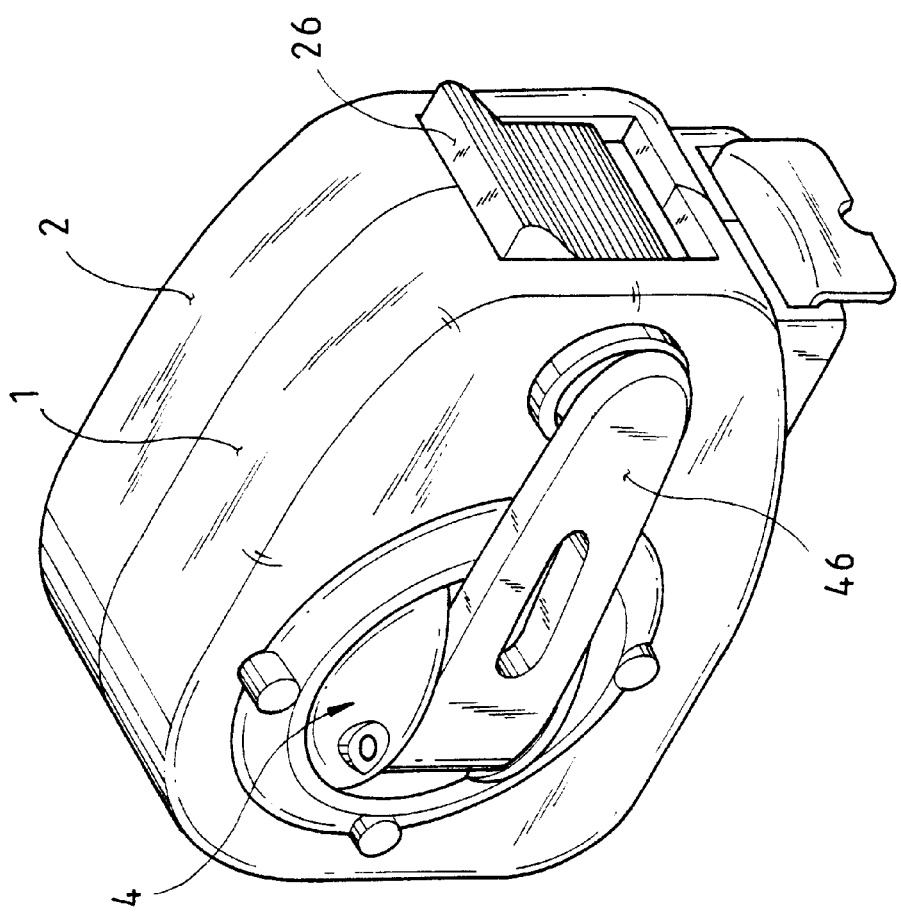
FIG. 1 is an isometric drawing of the invention herein.
Figure 2:
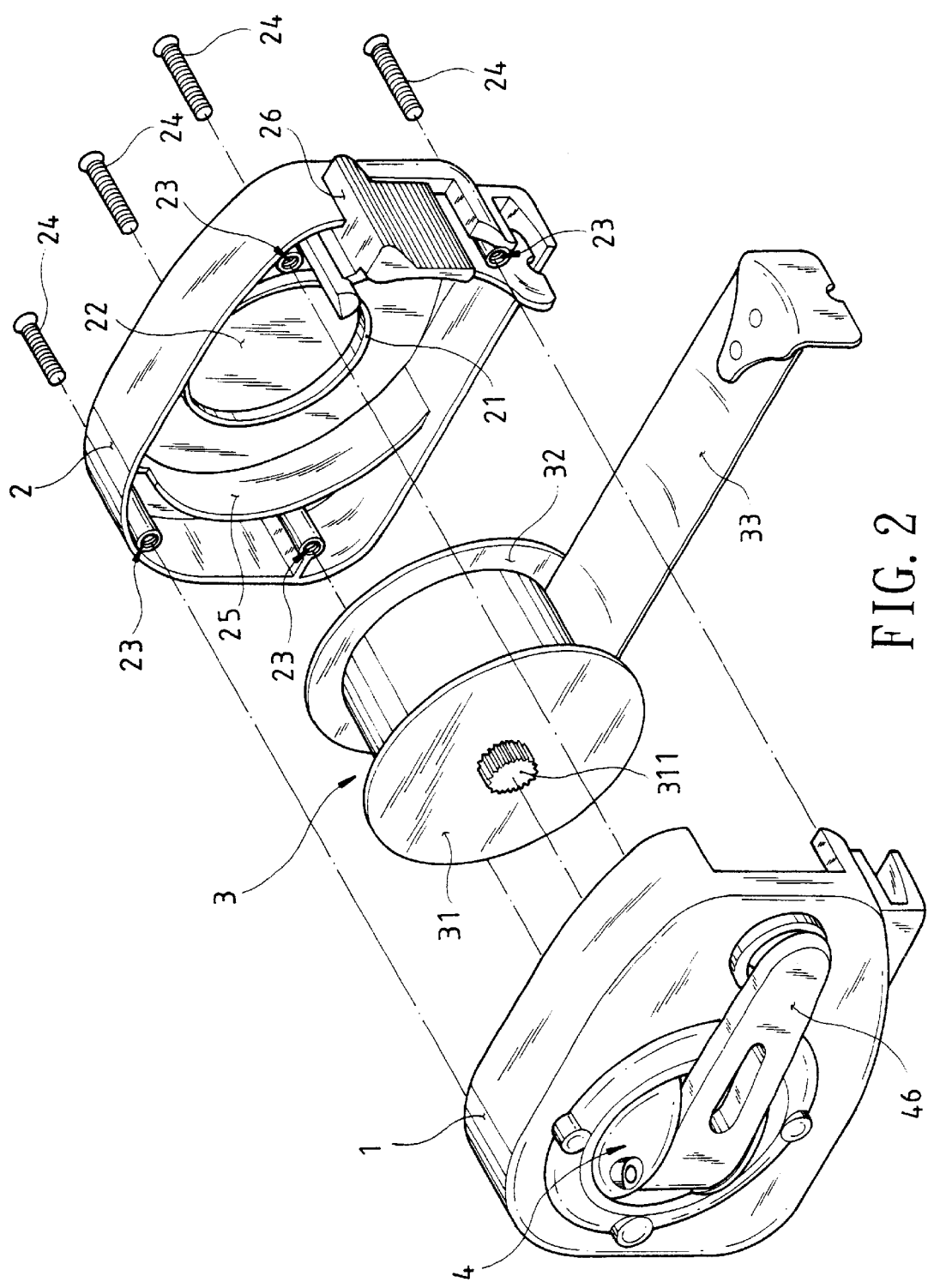
FIG. 2 is an exploded drawing of the invention herein.
Figure 3:
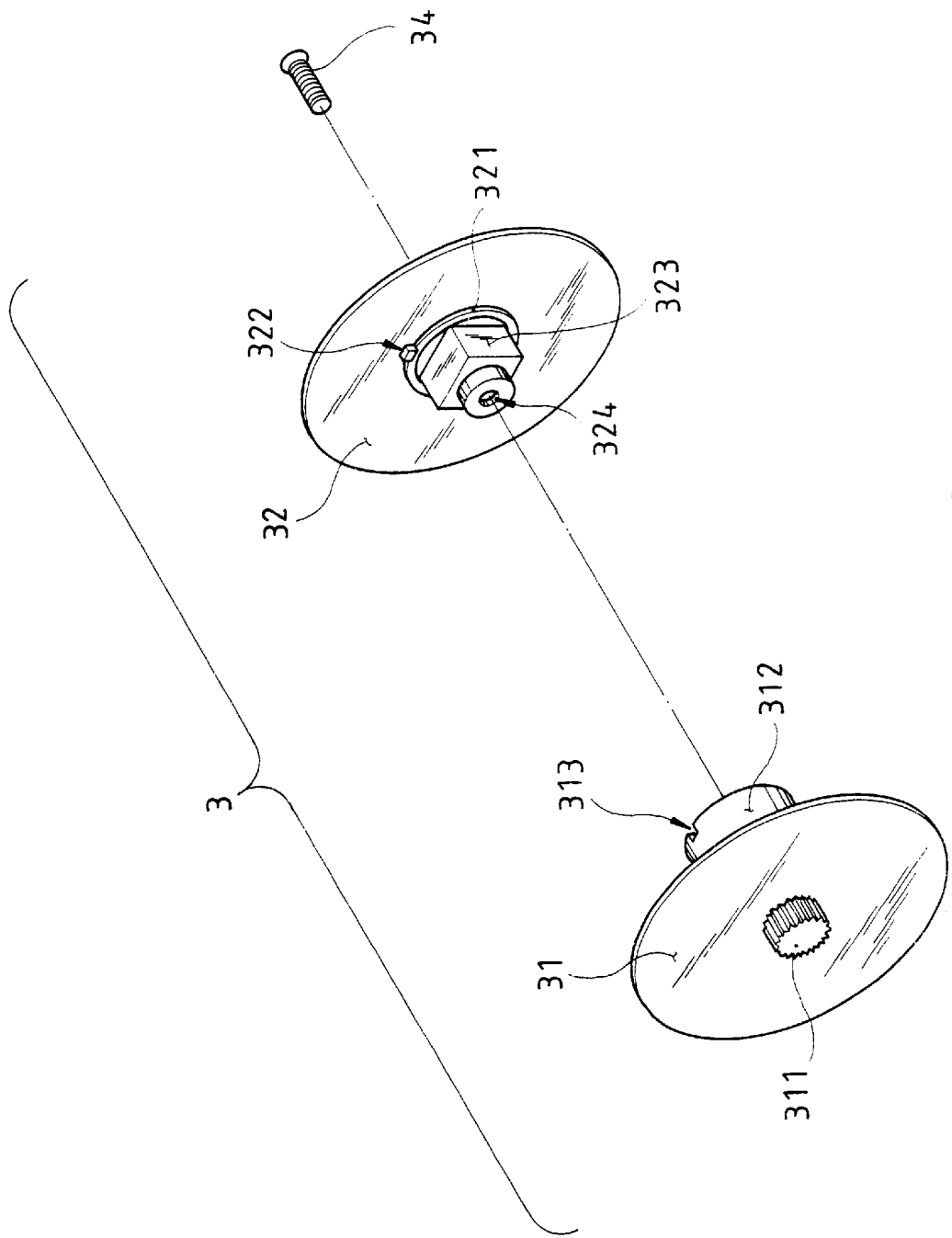
FIG. 3 is an exploded drawing of the reel 3 of the invention herein.
Figure 4:
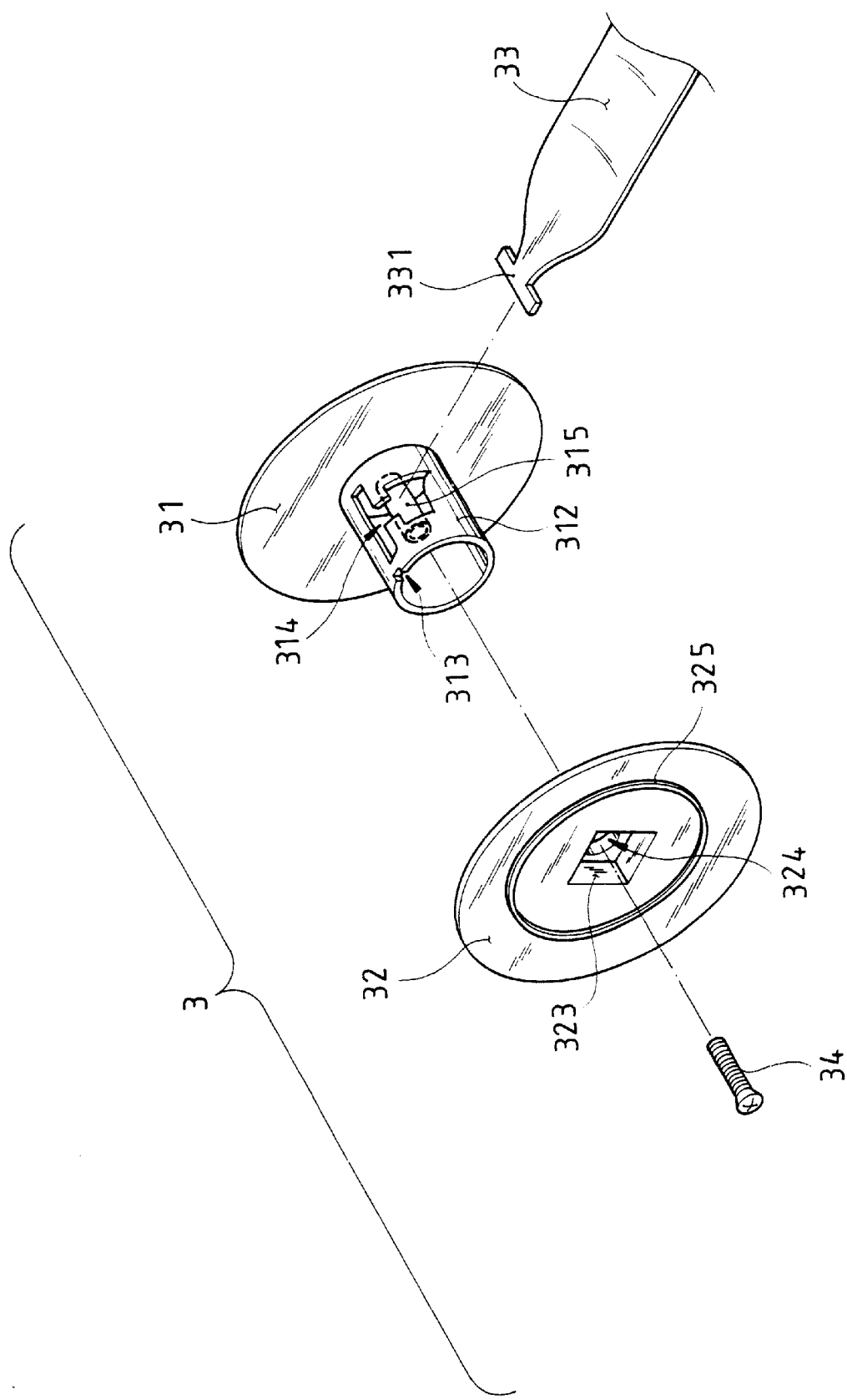
FIG. 4 is an exploded drawing of the reel 3 of the invention herein.
Figure 5:
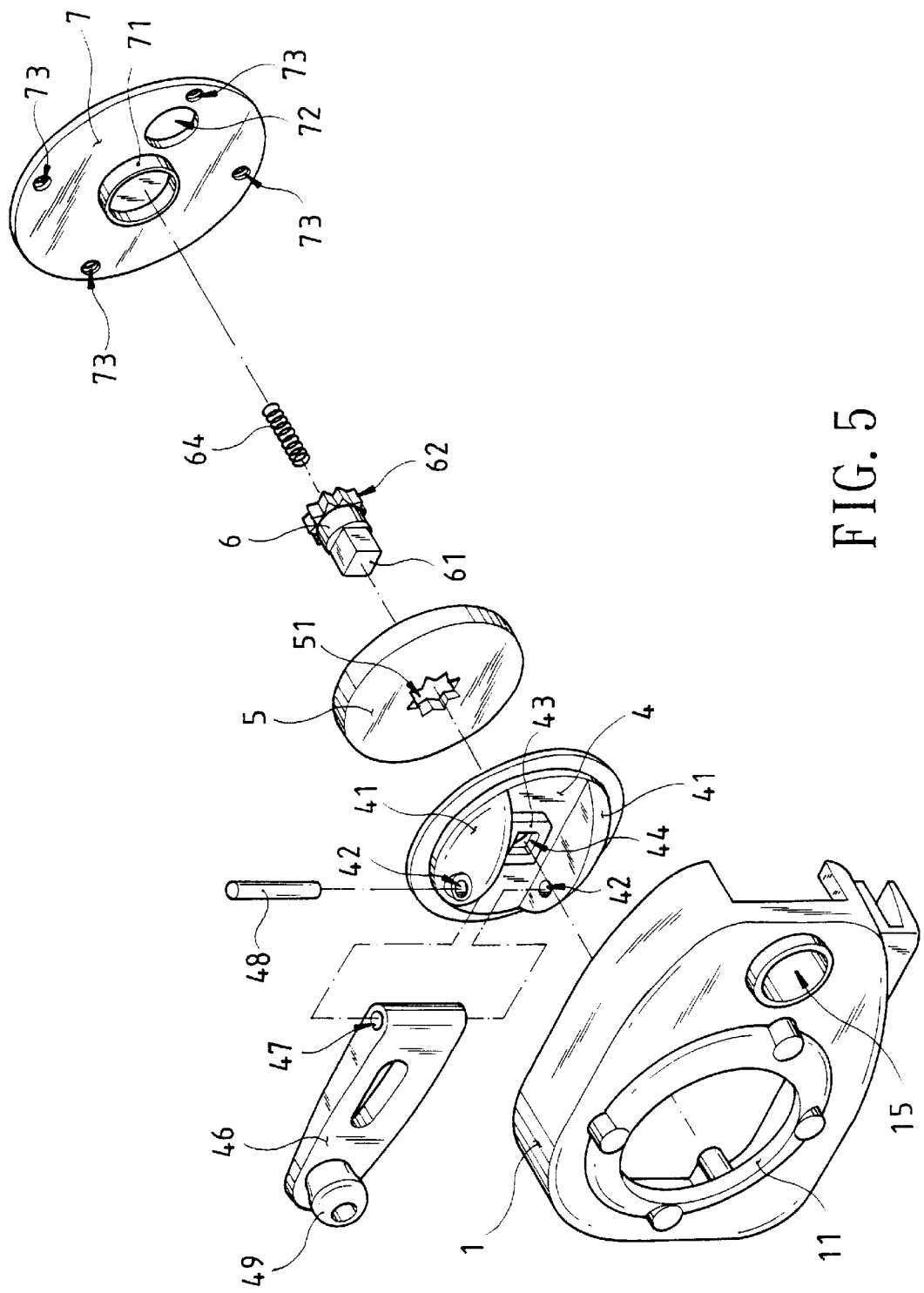
FIG. 5 is an exploded drawing of the rewinding gear train of the invention herein.
Figure 6:
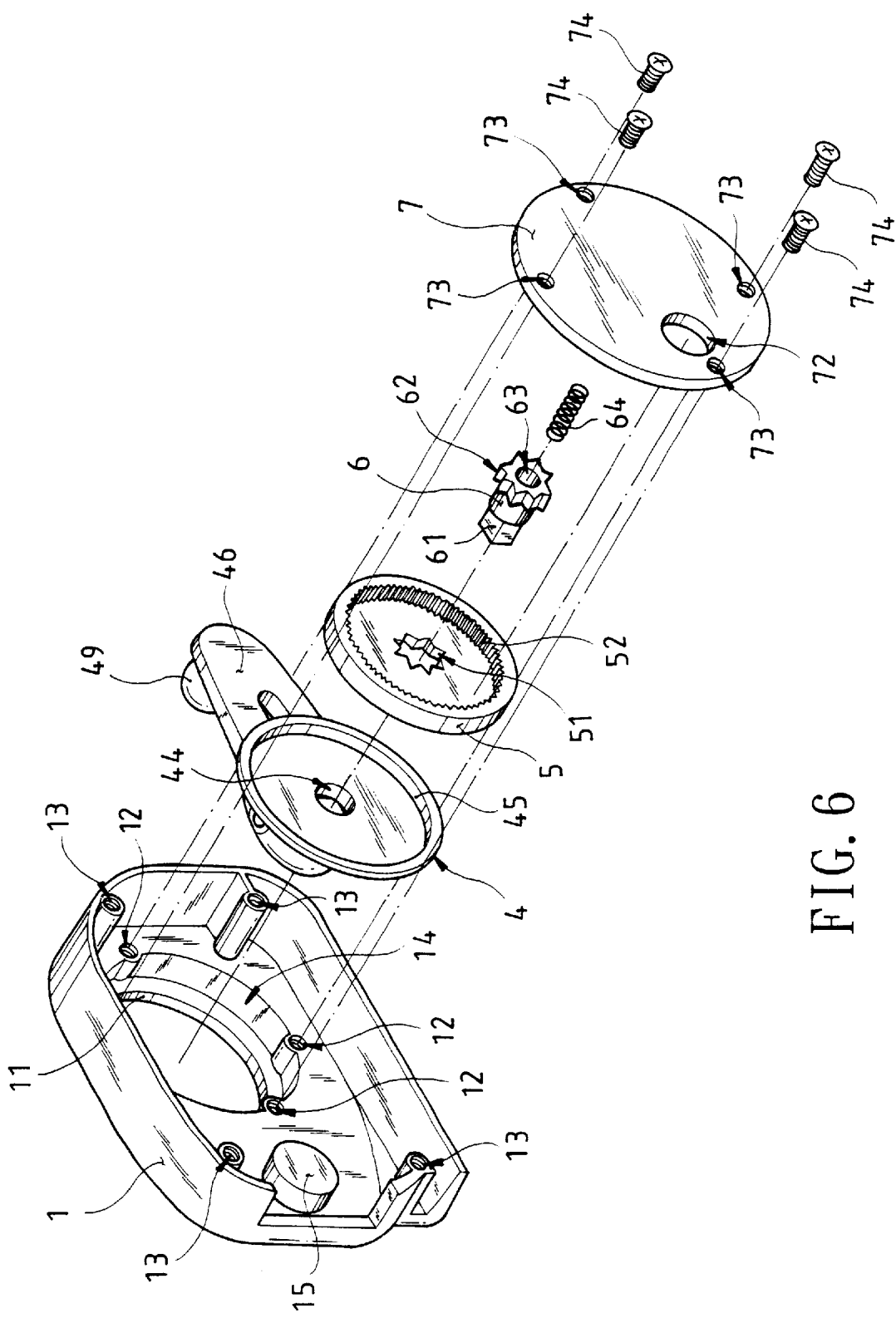
FIG. 6 is an exploded drawing of the rewind gear train of the invention herein.

Referring to FIG. 1, FIG. 2, FIG. 3, FIG. 4, FIG. 5, and FIG. 6, the tape rule with an automatic blade extension mechanism of the invention herein is comprised of a front case half 1, a rear case half 2, a reel 3, a rewind hub 4, a rewind gear 5, a locking component 6, and a gear cover 7, of which:

The front case half 1 is of one-piece plastic construction; the said front case half 1 has a round opening formed in its posterior section and, furthermore, with a bearing rim 11 disposed towards the interior, a plurality of raised, inward facing threaded holes 12 along the circumference of the bearing rim 11, and a groove 14 situated along the lateral inner side of the bearing rim 11; a plurality of elevated threaded holes 13 are distributed along the interior sides of the said front case half 1 and, furthermore, a prop rest 15 of a tubular shape extends inward near the forward edge of the said front case half 1.

The rear case half 2 is of one-piece plastic construction; the said rear case half 2 has a locating ring 21 at the center of its interior side and a bearing surface 22 within the locating ring 21; a plurality of elevated fastening holes 23 are formed along the interior sides of the said rear case half 2, a curved locating element 25 extends along the interior portion at the back of the said rear case half 2 and, furthermore, an arrestor button 26 is inserted into the forward edge of the said rear case half 2.

The reel 3 consists of a left flange 31, a right flange 32, and a ruler blade 33; the said left flange 31 is disc-shaped and has a gear 311 projecting from the center of its outer side; the left flange 31 has tubular spool 312 extending from its inner side and, furthermore, a locating notch 313 is formed in the extremity of the tubular spool 312; the said tubular spool 312 has a T-shaped clip slot 314 in its body and, furthermore, a threaded post 315 extends through the center of the said tubular spool 312. The said right flange 32 is disc-shaped and has a circular raised fitting 321 at its center and a locating block 322 extends from the said raised fitting 321; the said right flange 32 has a square member 323 projecting from the center of its inner side and, furthermore, a hole 324 is disposed through the center of the said square member 322; additionally, the said right flange 32 has a locating edge 325 on its outer side, with the said right flange 32 also consisting of a screw 34 that is inserted into the hole 324 and then fastened to the threaded post 315 at the center of the left flange 31 and, furthermore, the said locating block 322 is fitted into the locating notch 313 in the extremity of the tubular spool 312 at the inner side of the left flange 31, following which the T-shaped catch end 313 of the ruler blade 33 is inserted and fixed into the T-shaped clip slot 314 in the body of the said tubular spool 312 on left flange 31, and the entire ruler blade 33 is wound around the reel 3.

The rewind hub 4 has a convex block 41 contoured as a split pair along its outer side and a linkage hole 42 is formed through the posterior side of the said convex block 41; the said rewind hub 4 has a square collar 43 projecting from its center; the said rewind hub 4 has a drive hole 44 through its center, with the said drive hole 44 being square at the outer lateral extremity of the rewind hub 4 and round at the inner lateral extremity of the rewind hub 4; and the said rewind hub 4 has a bearing rim 45 formed into the surface of its inner side; the rewind hub 4 also consists of a crank 46 having a linkage hole 47 through one end and the said crank 46 has a grip rod 49 projecting from its other end; the arrangement of the said crank 47 is such that a hinge pin 48 is inserted into the linkage hole 42 in the two convex blocks 41 and into the linkage hole 47 of the crank 46, enabling the crank 46 to pivot 180 degrees around the axis of the hinge pin 48.

The rewind gear 5 has a star-shaped serrated hole 51 formed in its center, with ring gear teeth 52 disposed along the interior sides of the said rewind gear 5.

The locking component 6 is cylindrical along its center portion and has a square push button 61 at one extremity and a star-shaped serrated tip 62 flanging outward from its other extremity, with the locking component 6 having a hole 63 disposed in the center of the star-shaped serrated tip 62 for the entry of a spring 64.

The gear cover 7 is disc-shaped and has a locating ring 71 projecting from the center of one side and, furthermore, a hole 72 disposed laterally to the locating ring 71; and the said gear cover 7 has a plurality of fastening holes 73 along its outer circumference.

The rewind hub 4 of the invention herein is placed into the bearing rim 11 and the groove 14 of the front case half 1, the rewind gear 5 is then fitted onto the bearing rim 45 at the inner side of the rewind hub 4; the locking component 6 is inserted through the rewind gear 5 and into the drive hole 44 of the rewind hub 4 such that the square push button 61 at one extremity of the said locking component 6 extends through the rewind hub 4 drive hole 44; the star-shaped serrated tip 62 at the other end of the said locking component 6 is inserted into the star-shaped serrated hole 51 in the rewind gear 5; a respective plurality of screws 74 are inserted through the plurality of fastening holes 73 of the gear cover 7 and then secured into the threaded holes 12 of the front case half 1; the said reel 3 is inserted into the said gear cover 7 hole 72 by means of the gear 311 at the center of its left flange 31, which is then enmeshed with the ring gear teeth 52 along the interior sides of the rewind gear 5; the front case half 1 and the rear case half 2 are placed together with the reel 3 cradled between the curved locating element 25 and the locating ring 21 of the rear case half 2, a plurality of screws 24 are inserted through the rear case half 2 fastening holes 23 and secured into the front case half 1 threaded holes 13 to thereby assemble the present invention into a single structural entity.

As assembled from the said structural components, the tape rule of the invention herein functions such that under conditions of normal usage, the said crank 46 is postured against the front case half 1 and, furthermore, the grip rod 49 is situated in the prop rest 15; the crank 46 presses the push button 61 of the locking component 6 downward and the star-shaped serrated tip 62 at the opposite extremity of the locking component 6 is separated from the star-shaped serrated hole 51 in the rewind gear 5 such that the said rewind hub 4 and crank 46 cannot rotate the rewind gear 5; at the same time, since the reel 3 in the invention herein does not have a center-wound, spiral retraction spring, during measurements it is only necessary to move the arrestor button 26 upward to release the ruler blade 33 from its locked state, whereupon the ruler blade 3 extends automatically due to the torsion developed by the said ruler blade 33 when wound a number of turns around the reel 3; when the retraction of the ruler blade 33 is desired, the user folds the crank 46 outward by 180 degrees to the rotating position and the spring 64 in the other extremity of the said locking component 6 rebounds, causing the star-shaped serrated tip 62 of the locking component 6 to become inserted into the star-shaped serrated hole 51 in the rewind gear 5 such that turning the crank 46 drives the rewind gear 5 and rotates the reel 3 to enable the rapid and, furthermore, efficient retraction of the tape rule.

In summation of the foregoing section, since the tape rule with automatic blade extension mechanism herein is an original invention among this category of products that is capable of greater utility performance and possesses considerable practical value and, furthermore, no identical or similar article has been disclosed in the market, the invention herein is submitted to the examination committee for review and granting of the commensurate patent rights.

What is claimed is:

1. A tape rule with an automatic blade extension mechanism comprised of a front case half, a rear case half, a reel, a rewind hub, a rewind gear, a locking component, and a gear cover, of which:

The said front case half is of one-piece plastic construction; the said front case half has a round opening formed in its posterior section and, furthermore, with a bearing rim disposed towards the interior, a plurality of raised, inward facing threaded holes along the circumference of the said bearing rim, and a groove situated along the lateral inner side of the said bearing rim; a plurality of elevated threaded holes are distributed along the interior sides of the said front case half and, furthermore, a prop rest of a tubular shape extends inward near the forward edge of the said front case half;

The said rear case half is of one-piece plastic construction; the said rear case half has a locating ring at the center of its interior side and a bearing surface within the said locating ring; a plurality of elevated fastening holes are formed along the interior sides of the said rear case half, a curved locating element extends along the interior portion at the back of the said rear case half and, furthermore, an arrestor button is inserted into the forward edge of the said rear case half;

The said reel consists of a left flange, a right flange, and a ruler blade; the said left flange is disc-shaped and has a gear projecting from the center of its outer side; the said left flange has tubular spool extending from its inner side and, furthermore, a locating notch is formed in the extremity of the said tubular spool; the said tubular spool has a T-shaped clip slot in its body and, furthermore, a threaded post extends through the center of the said tubular spool; the said right flange is disc-shaped and has a circular raised fitting at its center and a locating block extends from the said raised fitting; the said right flange has a square member projecting from the center of its inner side and, furthermore, a hole is disposed through the center of the said square member; additionally, the said right flange has a locating edge on its outer side, with the said right flange also consisting of a screw that is inserted into the hole and then fastened to the threaded post at the center of the said left flange and, furthermore, the said locating block is fitted into the said locating notch in the extremity of the said tubular spool at the inner side of the said left flange, following which the T-shaped catch end of the said ruler blade is inserted and fixed into the said T-shaped clip slot in the body of the said tubular spool on the said left flange, and the entire said ruler blade is wound around the said reel;

The said rewind hub has a convex block contoured as a split pair along its outer side and a linkage hole is formed through the posterior side of the said convex block; the said rewind hub has a square collar projecting from its center; the said rewind hub has a drive hole through its center, with the said drive hole being square at the outer lateral extremity of the said rewind hub and round at the inner lateral extremity of the said rewind hub; and the said rewind hub has a bearing rim formed into the surface of its inner side; the said rewind hub also consists of a crank having a linkage hole through one end and the said crank has a grip rod projecting from its other end; the arrangement of the said crank is such that a hinge pin is inserted into the linkage hole in the two said convex blocks and into the said linkage hole of the said crank, enabling the said crank to pivot 180 degrees around the axis of the said hinge pin;

The said rewind gear has a star-shaped serrated hole formed in its center, with ring gear teeth disposed along the interior sides of the said rewind gear;

The said locking component is cylindrical along its center portion and has a square push button at one extremity and a star-shaped serrated tip flanging outward from its other extremity, with the said locking component having a hole disposed in the center of the said star-shaped serrated tip for the entry of a spring;

The said gear cover is disc-shaped and has a locating ring projecting from the center of one side and, furthermore, a hole disposed laterally to the said locating ring; and the said gear cover has a plurality of fastening holes along its outer circumference;

The said rewind hub is placed into the said bearing rim and the said groove of the said front case half, the said rewind gear is then fitted onto the said bearing rim at the inner side of the said rewind hub; the said locking component is inserted through the said rewind gear and into the said drive hole of the said rewind hub such that the said square push button at one extremity of the said locking component extends through the said rewind hub drive hole; the said star-shaped serrated tip at the other end of the said locking component is inserted into the said star-shaped serrated hole in the said rewind gear; a respective plurality of screws are inserted through the plurality of said fastening holes of the said gear cover and then secured into the said threaded holes of the said front case half; the said reel is inserted into the said gear cover hole by means of the said gear at the center of its said left flange, which is then enmeshed with the said ring gear teeth along the along the interior sides of the said rewind gear; the said front case half and the said rear case half are placed together with the said reel cradled between the said curved locating element and the said locating ring of the said rear case half, a plurality of screws are inserted through the said rear case half fastening holes and secured into the said front case half threaded holes to thereby assemble the present invention into a single structural entity.

\* \* \* \* \*